United States Patent
Wang et al.

(10) Patent No.: US 10,885,662 B2
(45) Date of Patent: Jan. 5, 2021

(54) DEPTH-MAP-BASED GROUND DETECTION METHOD AND APPARATUS

(71) Applicant: BeiJing Hjimi Technology Co., Ltd, Beijing (CN)

(72) Inventors: Hang Wang, Beijing (CN); Zan Sheng, Beijing (CN); Shuo Li, Beijing (CN); Xiaojun Zhou, Beijing (CN); Li Li, Beijing (CN)

(73) Assignee: Beijing Hjimi Technology Co., Ltd, Beijing (CN)

( * ) Notice: Subject to any disclaimer, the term of this patent is extended or adjusted under 35 U.S.C. 154(b) by 100 days.

(21) Appl. No.: 16/247,603

(22) Filed: Jan. 15, 2019

(65) Prior Publication Data
US 2019/0228536 A1    Jul. 25, 2019

(30) Foreign Application Priority Data

Jan. 19, 2018 (CN) .......................... 2018 1 0052737

(51) Int. Cl.
*G06T 7/73* (2017.01)
*G06T 7/12* (2017.01)

(52) U.S. Cl.
CPC ................ *G06T 7/73* (2017.01); *G06T 7/12* (2017.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 9,886,035 B1* | 2/2018 | Watts | ................. | G06K 9/00805 |
| 2015/0036887 A1* | 2/2015 | Allezard | ................... | G06T 7/75 |
| | | | | 382/106 |
| 2015/0269705 A1* | 9/2015 | Goodman | ............. | G06T 3/0037 |
| | | | | 382/154 |
| 2017/0142405 A1* | 5/2017 | Shors | ................. | G01B 11/2545 |
| 2017/0277197 A1* | 9/2017 | Liao | .......................... | G06T 7/20 |
| 2019/0213389 A1* | 7/2019 | Peruch | ............... | G06K 9/00201 |

* cited by examiner

*Primary Examiner* — Justin P. Misleh
(74) *Attorney, Agent, or Firm* — JCIPRNET

(57) ABSTRACT

This application provides a depth-map-based ground detection method and apparatus. The method includes: screening first sample points according to depth values of points in a current depth map; determining space coordinates of the first sample points, and determining space heights of the first sample points according to current gravity acceleration information and the space coordinates; screening second sample points in the first sample points according to the space heights; determining an optimal ground equation according to space coordinates of the second sample points; and determining a ground point in the depth map by using the optimal ground equation. Because the accuracy of the sample points that undergo secondary screening is high, the ground detection precision is high. Because this application is not excessively dependent on a depth value, the calculation complexity is low, and operation can be performed on various hardware.

12 Claims, 6 Drawing Sheets

DEPTH-MAP-BASED GROUND DETECTION METHOD AND APPARATUS

CROSS-REFERENCE TO RELATED APPLICATION

This application claims the priority benefit of China application serial no. 201810052737.6, filed on Jan. 19, 2018. The entirety of the above-mentioned patent application is hereby incorporated by reference herein and made a part of this specification.

FIELD OF THE INVENTION

This application relates to the field of image processing technologies, and in particular, to a depth-map-based ground detection method and apparatus.

DESCRIPTION OF RELATED ART

At present, ground detection has been widely applied to fields such as robot navigation, self-driving, somatosensory interaction, and security monitoring. Traditional ground detection is based on the consistency of ground color information in a color image, and that is applicable to a relatively simple scenario, and has relatively low reliability for a complex scenario. In related technologies, because a depth map has abundant space information relative to a color map, it is more advantageous to perform ground detection by using depth information of a scenario depth map. However, an existing depth-map-based ground detection method usually has a requirement for an attitude of a depth camera. If it is detected that the attitude of the camera does not meet a requirement, manual adjustment needs to be performed to make the attitude of the camera meet the requirement. Therefore, a problem that adaptability to different attitudes of a camera is poor, and manual intervention is needed exists.

SUMMARY OF THE INVENTION

Technical Problem

In view of this, this application provides a depth-map-based ground detection method and apparatus, to resolve the problem in the existing ground detection method that adaptability to different attitudes of a camera is poor, and manual intervention is needed.

Technical Solution

According to a first aspect of embodiments of this application, a depth-map-based ground detection method is provided. The method includes:

Obtaining a current depth map and gravity acceleration information from a collection device.

Screening first sample points according to depth values of points in the depth map.

Determining space coordinates of the first sample points, and determining space heights of the first sample points according to the space coordinates and the gravity acceleration information.

Continuing to screen second sample points in the first sample points according to the space heights.

Determining an optimal ground equation according to space coordinates of the second sample points.

Determining a ground point in the depth map by using the optimal ground equation.

According to a second aspect of the embodiments of this application, a depth-map-based ground detection apparatus is provided. The apparatus includes:

An obtaining module, configured to obtain a current depth map and gravity acceleration information from a collection device.

A first screening module, configured to screen first sample points according to depth values of points in the depth map.

A first determining module, configured to determine space coordinates of the first sample points, and determine space heights of the first sample points according to the space coordinates and the gravity acceleration information.

A second screening module, configured to continue to screen second sample points in the first sample points according to the space heights.

A second determining module, configured to determine an optimal ground equation according to space coordinates of the second sample points.

A ground point determining module, configured to determine a ground point in the depth map by using the optimal ground equation.

Advantageous Effect

By applying the embodiments of this application, after a current depth map and gravity acceleration information are obtained from a collection device, first sample points may be screened according to depth values of points in the depth map; and space coordinates of the first sample points are determined, and space heights of the first sample points are determined according to the space coordinates and the gravity acceleration information; then, second sample points continue to be screened in the first sample points according to the space heights; and an optimal ground equation is determined according to space coordinates of the second sample points; and a ground point in the depth map is determined by using the optimal ground equation. Based on the foregoing implementation, the space heights are calculated based on the gravity acceleration information. Because the gravity acceleration information is not affected by an attitude of a depth camera, the sample points screened according to the space heights are not affected by the attitude of the depth camera, so that this application is applicable to various camera attitudes, and it is applicable to detection of a scenario in which a relatively large amount of plane interference exists. In addition, in this application, after sample points are screened by using a depth value, sample points are further screened by using the space heights. Therefore, the accuracy of the sample points that undergo secondary screening is high, and the ground equation determined thereby is more precise, thereby improving the ground detection precision. In addition, because this application is not excessively dependent on a depth value, the calculation complexity is low, the execution efficiency is high, the occupied memory is low, and operation can be performed on various hardware.

DETAILED DESCRIPTION OF THE INVENTION

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the present application. On the contrary, the implementations are merely examples of apparatuses and methods that are described in detail in the appended claims and that are consistent with some aspects of the present application.

The terms used in this application are merely for the purpose of describing particular embodiments and are not intended to limit this application. The singular forms "a" and "the" used in this application and the appended claims also aim to include plural forms, unless the context clearly indicates otherwise. It should also be understood that the term "and/or" used herein refers to any or all possible combinations of one or more associated listed items.

It should be understood that although the terms first, second, third, etc. may be used in this application to describe various information, such information should not be limited to these terms. These terms are only used to distinguish the same type of information from each other. For example, first information may also be referred to as second information without departing from the scope of this application. Similarly, the second information may also be referred to as the first information. Depending on the context, for example, the word "if" used herein may be interpreted as "when" or "in response to determining".

Figure 1A:
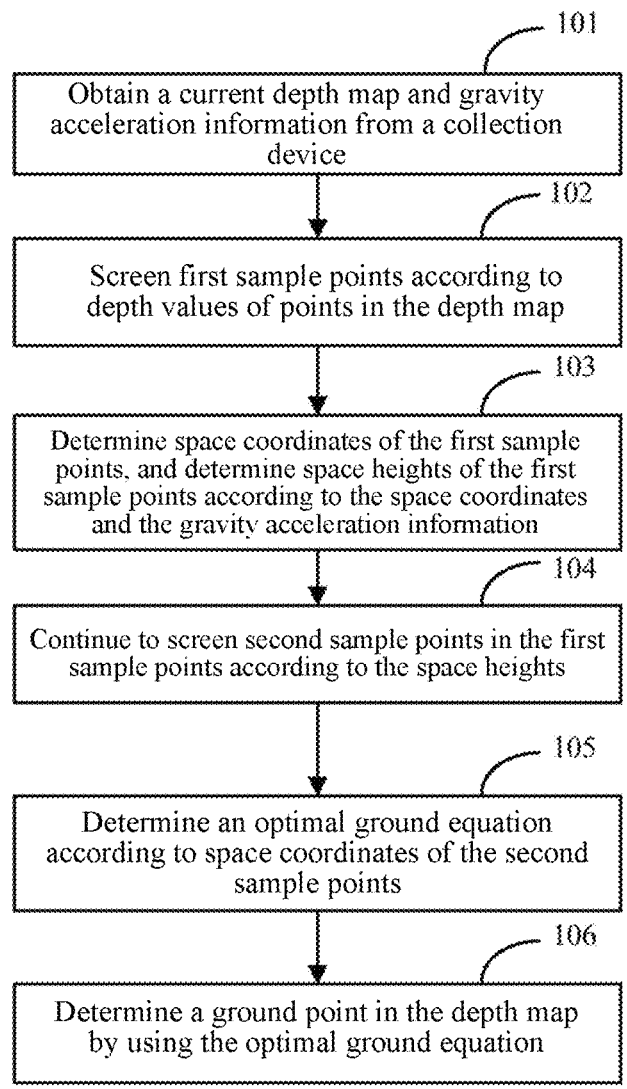
FIG. 1A is a flowchart of an embodiment of a depth-map-based ground detection method according to an exemplary embodiment of this application.
Figure 1B:
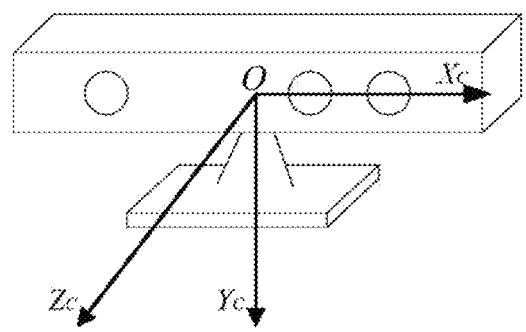
FIG. 1B is a camera coordinate system according to the embodiment shown in FIG. 1A of this application.
Figure 1C:
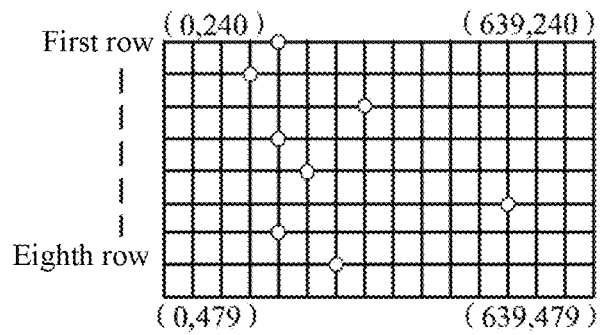
FIG. 1C to FIG. 1E are respectively schematic diagrams of grids marked with preliminary screening points, secondary screening points, and first sample points according to the embodiment shown in FIG. 1A of this application.
Figure 1D:
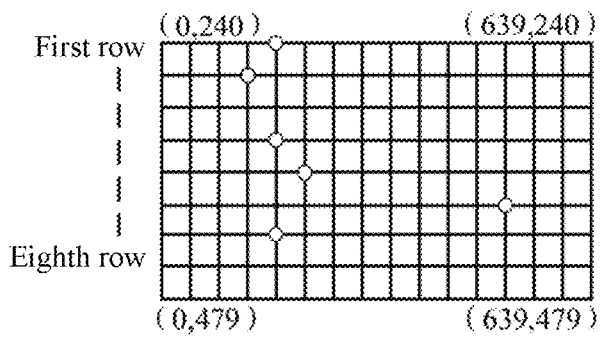
Figure 1E:
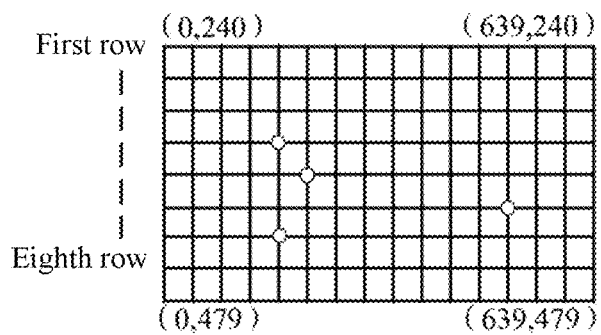
Figure 1F:
FIG. 1F is a depth map marked with a ground area according to the embodiment shown in FIG. 1A of this application.

FIG. 1A is a flowchart of an embodiment of a depth-map-based ground detection method according to an exemplary embodiment of this application. FIG. 1B is a camera coordinate system according to the embodiment shown in FIG. 1A. FIG. 1C to FIG. 1E are respectively schematic diagrams of grids marked with preliminary screening points, secondary screening points, and first sample points according to the embodiment shown in FIG. 1A. FIG. 1F is a depth map marked with a ground area according to the embodiment shown in FIG. 1A. This embodiment may be applied to a processing device (for example, a PC). As shown in FIG. 1A, the depth-map-based ground detection method includes the following steps:

Step 101: Obtain a current depth map and gravity acceleration information from a collection device.

In an embodiment, the collection device may include a depth camera and a gravity accelerometer. The depth map may be collected by using the depth camera, and the gravity acceleration information may be obtained by using the gravity accelerometer.

The gravity acceleration information is also a gravity acceleration vector. The vector uses a camera coordinate system for reference. In the camera coordinate system, an optical center O of the depth camera may be a coordinate origin, an optical axis of the depth camera is a $Z_C$-axis, a plane formed by an $X_C$-axis and a $Y_C$-axis is a plane of the depth camera, and the $X_C$-axis is perpendicular to the $Y_C$-axis, as shown in FIG. 1B.

Step 102: Screen first sample points according to depth values of points in the depth map.

In an embodiment, a grid may be first established in the depth map by using a preset step, to obtain grid points, and a grid point with a largest depth value in each horizontal grid line is determined as a preliminary screening point; then for each horizontal grid line, if a depth value of the preliminary screening point of the horizontal grid line exceeds a depth value of a preliminary screening point of a next horizontal grid line, the preliminary screening point of the horizontal grid line is determined as a secondary screening point; and finally, secondary screening points that are of consecutive adjacent horizontal grid lines and that have a number greater than a first preset number as the first sample points, where the first sample points are possible ground points.

The preset step refers to a difference between pixel index values in a horizontal or vertical direction of two grid points, and may be set according to practical experience. For example, the preset step is set to 8. A difference between depth values of adjacent points in the depth map is relatively small, and the calculation amount of screening according to a depth value of each point in the depth map is also relatively large. Therefore, by establishing a grid, a depth value of the horizontal grid line and the vertical grid line may be used to indicate a depth value of a point near the intersection point, and the calculation amount of the algorithm may be reduced. Because a ground is usually located a lower half part of the depth map, the grid may be established in a lower half part of the depth map, to further reduce the calculation amount of the algorithm. Moreover, due to the feature that in a same horizontal grid line, a depth of a ground from the depth camera is relatively large, and a corresponding depth value is also relatively large, a grid point with a largest depth value may be screened from each horizontal grid line as a preliminary screening point. In addition, a lower position of a ground point in the depth map indicates a smaller depth, and also a smaller corresponding depth value. Therefore, in the current horizontal grid line, a preliminary screening point whose depth value exceeds a depth value of a preliminary screening point of a next horizontal grid line may be further determined as a secondary screening point. To exclude isolated points, secondary screening points that are of consecutive adjacent horizontal grid lines and that have a number greater than a first preset number may be determined as the first sample points, and secondary screening points that do not meet the foregoing condition are discarded. The first preset number may be set according to practical experience, and for example, may be set to 3.

In an exemplary scenario, referring to FIG. 1C to FIG. 1E, the resolution of the depth map collected by the depth camera is 640×480, the preset step is 8, and the first preset number is 3. A grid is established in a lower half part of the depth map. That is, coordinates of four vertexes of the grid are respectively (0, 240), (639, 240), (0, 479), and (639, 479). Grid points marked by eight white dots shown in FIG. 1C are all preliminary screening points, to be specific, points with largest depth values in respective horizontal grid lines. Grid points marked by six white dots shown in FIG. 1D are all secondary screening points. To be specific, a depth value of a preliminary screening point in a current horizontal grid line exceeds a depth value of a preliminary screening point in a next horizontal grid line. Because the number of secondary screening points of consecutive adjacent horizontal grid lines (fourth, fifth, sixth, and seventh lines) in FIG. 1D exceeds 3, the secondary screening points in the horizontal grid lines of the fourth, fifth, sixth, and seventh rows are determined as the first sample points, namely, grid points marked by four white dots shown in FIG. 1E.

A person skilled in the art may understand that as shown in FIG. 1E, secondary screening points of a group of consecutive adjacent horizontal grid lines being used as the first sample points is merely for exemplary descriptions rather than for limitation. In this application, the number of groups of secondary screening points that are of consecutive adjacent horizontal grid lines and that have a number greater than the first preset number is not limited.

Step 103: Determine space coordinates of the first sample points, and determine space heights of the first sample points according to the space coordinates and the gravity acceleration information.

In an embodiment, the space coordinates of the first sample points refer to coordinates of the first sample points in the camera coordinate system. The space heights of the first sample points refer to the heights of the sample points relative to an optical center of the depth camera, to be specific, a distance from the sample points to the optical center of the depth camera in a gravity direction.

Figure 2A:
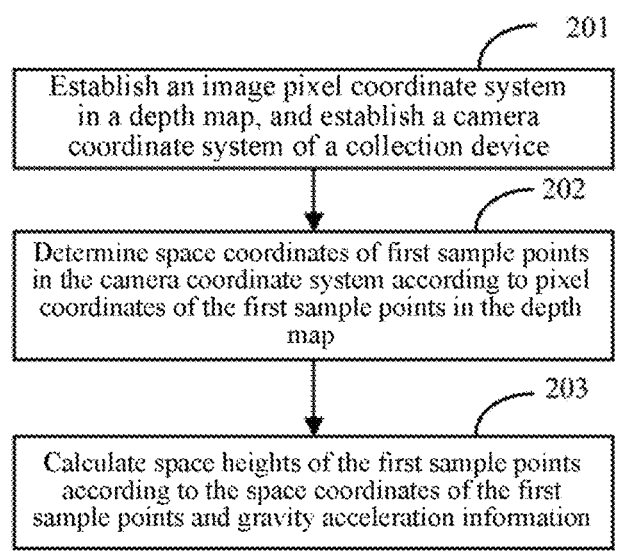
FIG. 2A is a flowchart of an embodiment of another depth-map-based ground detection method according to an exemplary embodiment of this application.

For the descriptions about how to determine the space coordinates of the first sample points, and determine the space heights of the first sample points according to the space coordinates and the gravity acceleration information, reference may be made to the descriptions of the embodiment shown in FIG. 2A, and details are not first described herein.

Step 104: Continue to screen second sample points in the first sample points according to the space heights.

Figure 3:
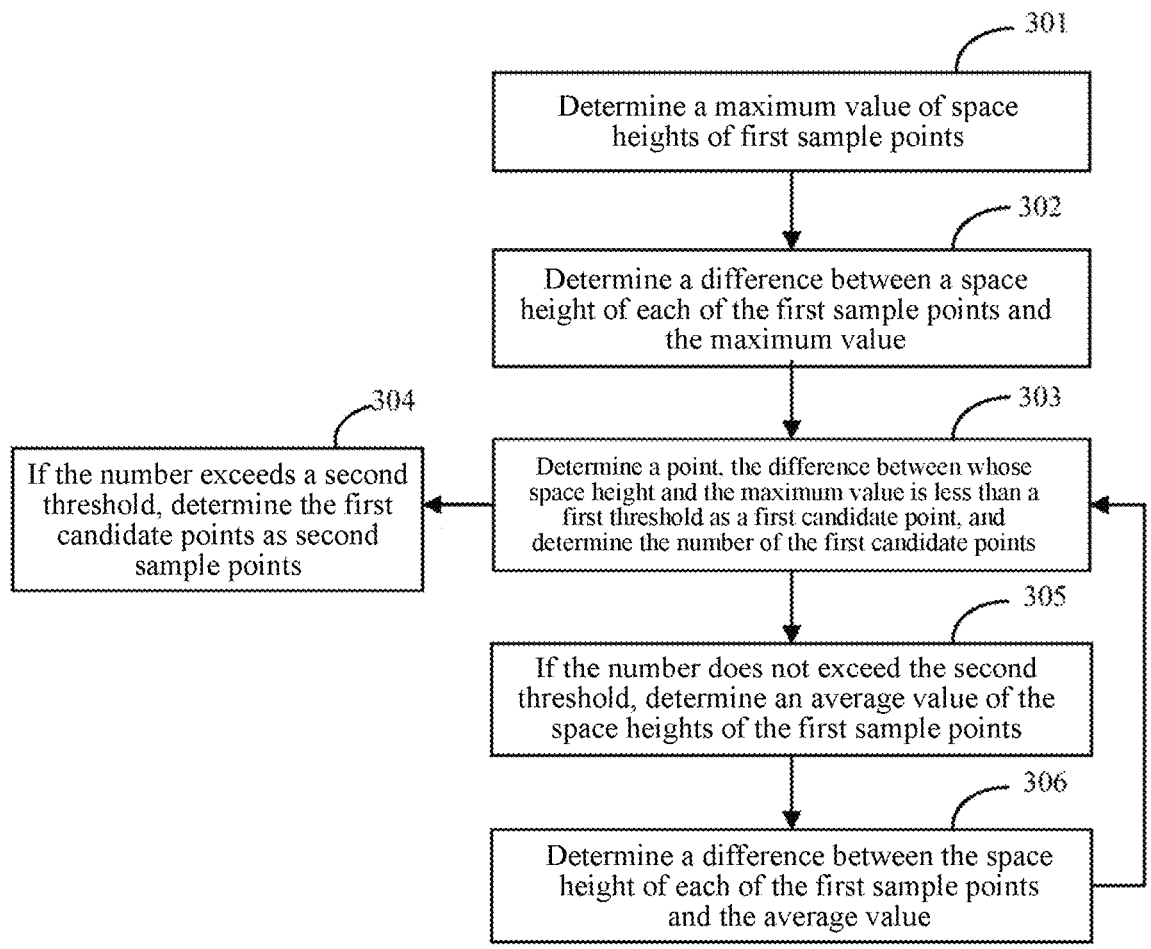
FIG. 3 is a flowchart of an embodiment of still another depth-map-based ground detection method according to an exemplary embodiment of this application.

For the descriptions about how to continue to screen the second sample points in the first sample points according to the space heights, reference may be made to the descriptions of the embodiment shown in FIG. 3, and details are not first described herein.

Step 105: Determine an optimal ground equation according to space coordinates of the second sample points.

In an embodiment, in the process of determining the optimal ground equation according to the space coordinates of the second sample points, a second preset number of groups of sample points may be selected from the second sample points, where the number of each group of sample points is at least three; then for each group of sample points, a ground equation of the group of sample points is determined, and a distance from each of the second sample points to a ground corresponding to the ground equation is calculated, and statistics on the number of points, the distance from which to the ground is less than a fourth threshold are collected; and finally, a ground equation corresponding to a maximum number is determined as the optimal ground equation.

The second preset number refers to the number of times of sampling in the second sample points, and may be set according to practical experience. According to the principle of one plane determined by at least three points, at least three second sample points are sampled each time. To reduce the complexity of calculating a plane equation, three second sample points may be sampled each time. The fourth threshold may be set according to practical experience. If the number of second sample points, the distance from which to the ground corresponding to a ground equation obtained through particular sampling is less than the fourth threshold is maximum, the ground equation obtained through the particular sampling is used as the optimal ground equation.

Detailed descriptions are provided below by using an example that the number of sampled points is three.

It is assumed that a group of sample points selected from the second sample points are $P_R$, $P_S$, and $P_T$, and space coordinates are respectively $(X_R, Y_R, Z_R)$, $(X_S, Y_S, Z_S)$, and $(X_T, Y_T, Z_T)$.

1. Any two pairs of points $[P_R, P_S]$ and $[P_S, P_T]$ are selected, and vectors of the two pairs of points are separately calculated:

$$\overrightarrow{P_R P_S} = (X_S - X_R, Y_S - Y_R, Z_S - Z_R);$$

$$\overrightarrow{P_S P_T} = (X_T - X_S, Y_T - Y_S, Z_T - Z_S).$$

2. Normal vectors of the two pairs of points $[P_R, P_S]$ and $[P_S, P_T]$ are calculated:

$$\vec{n} = \overrightarrow{P_R P_S} \times \overrightarrow{P_S P_T}$$

3. A point P is randomly selected in a plane formed by $P_R$, $P_S$, and $P_T$, the coordinate of the point P is (x, y, z), and a vector of the point P and the point $P_R$ is calculated as:

$$\overrightarrow{P_R P} = (x - X_R, y - Y_R, z - Z_R).$$

4. A ground equation $Ax + By + Cz + D = 0$ is obtained from $\vec{n} \cdot \overrightarrow{P_R P} = 0$, where A, B, C, and D are constants formed by $X_R$, $Y_R$, $Z_R$, $X_S$, $Y_S$, $Z_S$, $X_T$, $Y_T$, and $Z_T$.

5. A point (X', Y', Z') is randomly selected from the second sample points, and a distance from the point to a ground corresponding to the ground equation is calculated:

$$d = \frac{|AX' + BY' + CZ' + D|}{\sqrt{A^2 + B^2 + C^2}}$$

Step 106: Determine a ground point in the depth map by using the optimal ground equation.

In an embodiment, space coordinates of grid points in the lower half part of the depth map may be first determined, and for each grid point, a distance from the point to a ground corresponding to the optimal ground equation is calculated according to the space coordinated of the grid point, and a grid point, a distance from which to the ground is less than a fifth threshold is selected, and a final ground point in the depth map is determined according to the selected grid points.

For the descriptions about how to specifically determine the space coordinates of the points in the depth map, reference may be made to the related descriptions of the embodiment shown in FIG. 2A, and details are not first described herein. For calculation of the distance from the points to the ground corresponding to the optimal ground equation, reference may be made to the related descriptions about the foregoing step 105, and details are not described again. How to specifically determine the final ground point in the depth map according to the selected grid points is described in detail below by using an example.

For example, four grid points whose grid lines in horizontal and vertical directions are adjacent to each other are selected. If the four grid points all meet the condition that the distance is less than the fifth threshold, pixels in a square area formed by the four grid points are all marked as final ground points; if none of the four grid points meet the condition that the distance is less than the fifth threshold, pixels in the square area formed by the four grid points are discarded; if not all of the four grid points meet the condition that the distance is less than the fifth threshold, pixels included in the square area formed by the four grid points are obtained, and distances from the points to a ground corresponding to the optimal ground equation are calculated, and a pixel, a distance from which to the ground is less than the fifth threshold is marked as a final ground point. By analogy, all four grid points whose grid lines are adjacent to each other are traversed according to the foregoing method.

In an embodiment, a determined ground point may be highlighted in the depth map, to facilitate viewing a ground area in the depth map by a user. FIG. 1F shows a depth map marked with a ground area (the white area part).

In this embodiment, after a current depth map and gravity acceleration information are obtained from a collection device, first sample points may be screened according to depth values of points in the depth map; and space coordinates of the first sample points are determined, and space heights of the first sample points are determined according to the space coordinates and the gravity acceleration information; then, second sample points continue to be screened in the first sample points according to the space heights; and an optimal ground equation is determined according to space coordinates of the second sample points; and a ground point in the depth map is determined by using the optimal ground equation. Based on the foregoing implementation, the space heights are calculated based on the gravity acceleration information. Because the gravity acceleration information is not affected by an attitude of a depth camera, the sample points screened according to the space heights are not affected by the attitude of the depth camera, so that this application is applicable to various camera attitudes, and is applicable to detection of a scenario in which a relatively large amount of plane interference exists. In addition, in this application, after sample points are screened by using a depth value, sample points are further screened by using the space heights. Therefore, the accuracy of the sample points that undergo secondary screening is high, and the ground equation determined thereby is more precise, thereby improving the ground detection precision. In addition, because this application is not excessively dependent on a depth value, the calculation complexity is low, the execution efficiency is high, the occupied memory is low, and operation can be performed on various hardware.

Figure 2B:
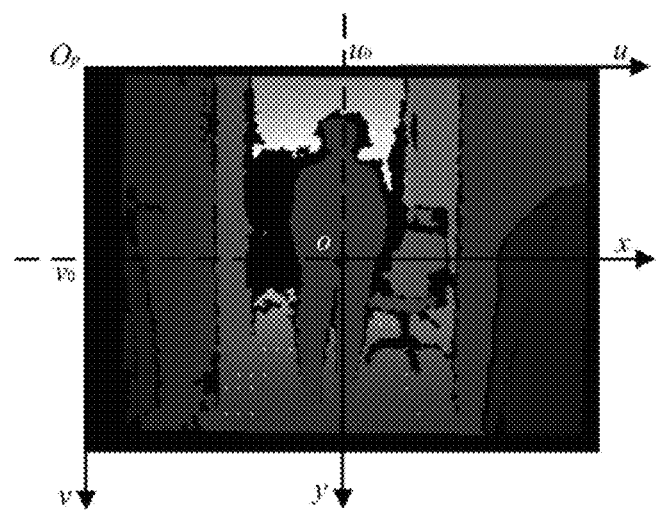
FIG. 2B is a schematic diagram of a relationship between an image pixel coordinate system and an image physical coordinate system according to the embodiment shown in FIG. 2A of this application.
Figure 2C:
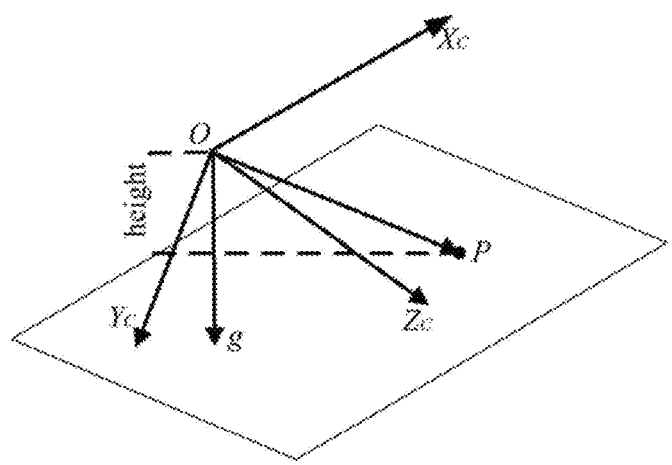
FIG. 2C is a schematic diagram of a projection of space coordinate vectors of points in a camera coordinate system in a gravity acceleration direction according to the embodiment shown in FIG. 2A of this application.

FIG. 2A is a flowchart of an embodiment of another depth-map-based ground detection method according to an exemplary embodiment of this application. FIG. 2B is a schematic diagram of a relationship between an image pixel coordinate system and an image physical coordinate system according to the embodiment shown in FIG. 2A of this application. FIG. 2C is a schematic diagram of a projection of space coordinate vectors of points in a camera coordinate system in a gravity acceleration direction according to the embodiment shown in FIG. 2A of this application. This embodiment is exemplarily described by using the foregoing method provided in the embodiments of this application by using an example of how to determine space coordinates of first sample points, and determine space heights of the first sample points according to the space coordinates and gravity acceleration information. As shown in FIG. 2A, the depth-map-based ground detection method includes the following steps:

Step 201: Establish an image pixel coordinate system in a depth map, and establish a camera coordinate system of a collection device.

In the image pixel coordinate system, an upper left vertex of the depth map may be a coordinate origin Op, a horizontal direction is a u-axis, and a vertical direction is a v-axis, for indicating a row and a column in which a point is located in an image plane. The camera coordinate system of the collection device is shown in FIG. 1B. An optical center O of a depth camera is a coordinate origin, an optical axis of the depth camera is a $Z_C$-axis, a plane formed by the $X_C$-axis and the $Y_C$-axis is a plane of the depth camera, and the u-axis and the v-axis in the image pixel coordinate system are respectively parallel to the $X_C$-axis and the $Y_C$-axis in the camera coordinate system.

Step 202: Determine space coordinates of first sample points in the camera coordinate system according to pixel coordinates of the first sample points in the depth map.

Before the step 202 is performed, an image physical coordinate system further needs to be established in the depth map. An intersection point of an optical center of the depth camera and the depth map is a coordinate origin O. A relationship between the image physical coordinate system and the image pixel coordinate system is shown in FIG. 2B. The x-axis and the y-axis of the image physical coordinate system are respectively parallel to the u-axis and the v-axis of the image pixel coordinate system. Coordinate values may be represented by using millimeter as a physical unit, and the x-axis and the y-axis of the image physical coordinate system are further respectively parallel to the $X_C$-axis and the $Y_C$-axis of the camera coordinate system. According to a projective geometry principle, the following uses an example of a point P whose pixel coordinate is (u, v) in the depth map, to specifically describe how to determine a space coordinate $(X_C, Y_C, Z_C)$ of the point in the camera coordinate system.

1. According to a triangulation principle, a derivation formula from a space coordinate to an image physical coordinate is as follows:

$$\begin{cases} \dfrac{x}{X_C} = \dfrac{f}{Z_C} \\ \dfrac{y}{Y_C} = \dfrac{f}{Z_C} \end{cases}$$

where f is a constant and represents an equivalent camera image space focal length, and the size of f is determined by hardware of the depth camera. (x, y) represents a coordinate of the point P in the image physical coordinate system.

2. A derivation formula from an image physical coordinate to an image pixel coordinate is as follows:

$$\begin{cases} u = \dfrac{x}{\Delta x} + u_0 \\ v = \dfrac{y}{\Delta y} + v_0 \end{cases}$$

where $\Delta x$ and $\Delta y$ are constants, and respectively represent sizes of a single pixel in horizontal and vertical directions; $u_0$ and $v_0$ are also constants, and respectively represent a column index value and a row index value of a principal point of an image plane, as shown in FIG. 2B.

3. The formulas in the foregoing 1 and 2 are converted into a form of a homogeneous equation as follows:

$$Z_C \begin{pmatrix} u \\ v \\ 1 \end{pmatrix} = \begin{pmatrix} f_x & 0 & u_0 & 0 \\ 0 & f_y & v_0 & 0 \\ 0 & 0 & 1 & 0 \end{pmatrix} \begin{pmatrix} X_C \\ Y_C \\ Z_C \\ 1 \end{pmatrix}$$

where $f_x = f/\Delta x$, and $f_y = f/\Delta y$.

4. Inverse operation is performed on the equation in the foregoing 3, so that the space coordinate $(X_C, Y_C, Z_C)$ of the point P, that is, a position of the point P in actual space can be calculated.

A person skilled in the art may understand that the foregoing f, $u_0$, $v_0$, $\Delta x$, and $\Delta y$ are all intrinsic parameters of the depth camera, and are determined by hardware of the depth camera.

Step 203: Calculate space heights of the first sample points according to the space coordinates of the first sample points and gravity acceleration information.

In an embodiment, space heights of the first sample points may be calculated by using the following formula:

$$\text{height} = \frac{|\overrightarrow{OP} \cdot \vec{g}|}{|\vec{g}|}$$

where $\overrightarrow{OP}$ represents a vector of the point P in the camera coordinate system, and $\vec{g}$ represents a gravity acceleration vector. The space height of the first sample point refers to an actual space height obtained by projecting a space coordinate vector of the point P onto the gravity acceleration vector, as shown in FIG. 2C.

It should be noted that an attitude of the depth camera can be automatically obtained by calculating an angle between the gravity acceleration vector and an optical axis (that is, the $Z_C$-axis) of the camera.

In this embodiment, the pixel coordinates of the first sample points are converted into the space coordinates in the camera coordinate system, to obtain positions of the first sample points in actual space, thereby calculating the space heights of the first sample points, that is, the actual heights relative to the optical center of the depth camera, according to the space coordinates of the first sample points and the gravity acceleration information, for subsequently further screening sample points, to break away from the effect of the attitude of the depth camera.

FIG. 3 is a flowchart of an embodiment of still another depth-map-based ground detection method according to an exemplary embodiment of this application. This embodiment is exemplarily described by using the foregoing method provided in the embodiments of this application by using an example of how to continue to screen second sample points in first sample points according to space heights. As shown in FIG. 3, the depth-map-based ground detection method includes the following steps:

Step 301: Determine a maximum value of space heights of first sample points.

In an embodiment, the ground is usually located at a lowest position of an entire scenario, and therefore the space height of a ground point should be maximum relative to other points in the scenario, and therefore a point with a maximum space height may be first found from the first sample points.

Step 302: Determine a difference between a space height of each of the first sample points and the maximum value.

Step 303: Determine a point, the difference between whose space height and the maximum value is less than a first threshold as a first candidate point, and determine the number of the first candidate points.

In an embodiment, a smaller difference between the space height of each of the first sample points and the maximum value indicates a higher possibility that the point is a ground point. Therefore, a point, the difference between whose space height and the maximum value is less than a first threshold may be used as a first candidate point, and the first threshold may be set according to practical experience.

Step 304: If the number exceeds a second threshold, determine the first candidate points as second sample points.

In an embodiment, the second threshold indicates the minimum number of points required, and may be set according to practical experience.

In an embodiment, when the number of the first candidate points exceeds the second threshold, the number of the second sample points may be further limited to reduce the calculation amount of the algorithm. For example, if the number of the first candidate points exceeds a threshold (the threshold is greater than the second threshold, or may be called as a high threshold), a preset multiple (for example, 0.5) of the high threshold of points whose space heights are closer to the maximum value are determined as second sample points. If the number of the first candidate points is between the high threshold and the second threshold, the first candidate points may be determined as the second sample points.

Step 305: If the number does not exceed the second threshold, determine an average value of the space heights of the first sample points.

In an embodiment, when the number of the first candidate points does not exceed the second threshold, and the number of the first candidate points is less than the minimum number of points required, screening may be further performed by using an average value of the space heights of the first sample points.

Step 306: Determine a difference between the space height of each of the first sample points and the average value, and return to execute a process of the step 303.

It should be noted that after screening by using the maximum value and the average value of the space heights of the first sample points, if the number of the obtained first candidate points is less than the second threshold (the minimum number of points required), a preset step for establishing a grid is reduced by half, and the method returns to the process of the step 102, until the preset step is less than a threshold. In this case, it is determined that ground detection fails or there is no ground currently.

In an embodiment, after the step 306 is performed, because the second sample points screened in the first sample points are longitudinal sample points (row sample points) in the grid, to enrich the constituent structures of the second sample points, horizontal expansion (column sample points are expanded) may be continued on the second sample points, to further improve the ground detection precision. For example, when the number of the first candidate points exceeds the second threshold, the to-be-expanded number of each horizontal grid line is determined according to the number of the first candidate points; for each horizontal grid line on which each second sample point is located, a grid point, a difference between whose space height and a space height of the second sample point is less than a third threshold in the horizontal grid line is determined as a second candidate point, and the second candidate point is supplemented to the second sample points, until the number of the second candidate points reaches the to-be-expanded number.

In an embodiment, in the process of determining the to-be-expanded number of each horizontal grid line according to the number of the first candidate points, as stated in the step 304, if the number of the first candidate points exceeds a high threshold, the to-be-expanded number PerLineSampleNum is set to a value (for example, 2); if the number of the first candidate points is between the high threshold and the second threshold, the to-be-expanded number PerLineSampleNum is set to the high threshold/the number of the first candidate points.

In this embodiment, by using a result of comparison between the maximum value of the space heights of the first sample points (or the average value of the space heights of the first sample points) and the space height of each first sample point, second sample points are further screened from the first sample points. Because the ground is usually located at a lowest position of an entire scenario, the space height of a ground point should be maximum relative to other points in the scenario. Therefore, the accuracy of the second sample points screened by using the maximum value of the space heights of the first sample points is higher.

Corresponding to the foregoing embodiment of the depth-map-based ground detection method, this application further provides an embodiment of a depth-map-based ground detection apparatus.

Figure 4:
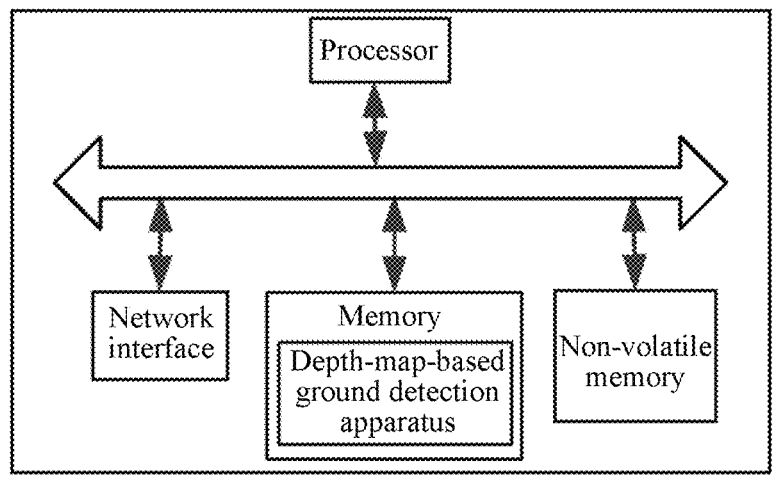
FIG. 4 is a structural diagram of hardware of a processing device according to an exemplary embodiment of this application.

The embodiment of the depth-map-based ground detection apparatus of this application may be applied to a processing device. The apparatus embodiment may be implemented by software, or may be implemented by hardware or a combination of hardware and software. Using software implementation as an example, as an apparatus in a logical sense, the apparatus is formed by reading, by a processor of a device in which the apparatus is located, a corresponding computer program instruction in a non-volatile memory into a memory for operation. From a hardware level, FIG. 4 is a structural diagram of hardware of a processing device according to an exemplary embodiment of this application. In addition to a processor, a memory, a network interface, and a non-volatile memory shown in FIG. 4, the device in which the apparatus in this embodiment is located usually includes other hardware according to actual functions of the device. Details are not described herein again.

Figure 5:
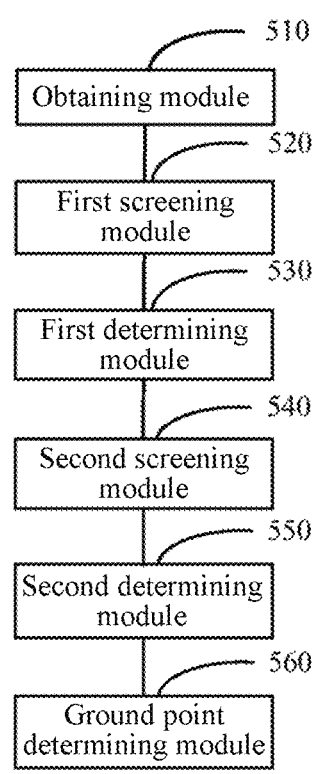
FIG. 5 is a structural diagram of an embodiment of a depth-map-based ground detection apparatus according to an exemplary embodiment of this application.

FIG. 5 is a structural diagram of an embodiment of a depth-map-based ground detection apparatus according to an exemplary embodiment of this application. This embodiment may be applied to a processing device. As shown in FIG. 5, the depth-map-based ground detection apparatus includes: an obtaining module 510, a first screening module 520, a first determining module 530, a second screening module 540, a second determining module 550, and a ground point determining module 560.

The obtaining module 510 is configured to obtain a current depth map and gravity acceleration information from a collection device.

The first screening module 520 is configured to screen first sample points according to depth values of points in the depth map.

The first determining module 530 is configured to: determine space coordinates of the first sample points, and determine space heights of the first sample points according to the space coordinates and the gravity acceleration information.

The second screening module 540 is configured to continue to screen second sample points in the first sample points according to the space heights.

The second determining module 550 is configured to determine an optimal ground equation according to space coordinates of the second sample points.

The ground point determining module 560 is configured to determine a ground point in the depth map by using the optimal ground equation.

In an optimal implementation, the first screening module 520 is specifically configured to: establish a grid in the depth map by using a preset step, to obtain grid points, where the grid is formed by horizontal grid lines and vertical grid lines, and an intersection point of the horizontal grid line and the vertical grid line is a grid point; determine a grid point with a largest depth value in each horizontal grid line as a preliminary screening point; for each horizontal grid line, if a depth value of the preliminary screening point of the horizontal grid line exceeds a depth value of a preliminary screening point of a next horizontal grid line, determine the preliminary screening point of the horizontal grid line as a secondary screening point; and determine secondary screening points that are of consecutive adjacent horizontal grid lines and that have a number greater than a first preset number as the first sample points, where the first sample points are possible ground points.

In an optional implementation, the second screening module 540 is specifically configured to: determine a maximum value of the space heights of the first sample points; determine a difference between a space height of each of the first sample points and the maximum value; determine a point, the difference between whose space height and the maximum value is less than a first threshold as a first candidate point, and determine the number of the first candidate points; if the number exceeds a second threshold, determine the first candidate points as the second sample points; or if the number does not exceed the second threshold, determine an average value of the space heights of the first sample points, determine a difference between the space height of each of the first sample points and the average value, and return to execute the process of determining a point, the difference between whose space height and the maximum value is less than a first threshold as a first candidate point.

In an optional implementation, the apparatus further includes (not shown in FIG. 5):

A sample point expansion module, specifically configured to: before the second determining module 550 determines the optimal ground equation according to the space coordinates of the second sample points, when the number of the first candidate points exceeds the second threshold, determine the to-be-expanded number of each horizontal grid line according to the number of the first candidate points; for each horizontal grid line on which each second sample point is located, determine a grid point, a difference between whose space height and a space height of the second sample point is less than a third threshold in the horizontal grid line as a second candidate point, and supplement the second candidate point to the second sample points, until the number of the second candidate points reaches the to-be-expanded number.

In an optional implementation, the first determining module 530 is specifically configured to: establish an image pixel coordinate system in the depth map, and establish a camera coordinate system of the collection device, where in the image pixel coordinate system, an upper left vertex of the depth map is a coordinate origin, a horizontal direction is a u-axis, a vertical direction is a v-axis, and in the camera coordinate system, an optical center O of a depth camera is a coordinate origin, an optical axis of the depth camera is a $Z_C$-axis, an $X_C$-axis and a $Y_C$-axis of the camera coordinate system are respectively parallel to the u-axis and the v-axis, and a plane formed by the $X_C$-axis and the $Y_C$-axis is a plane of the depth camera; determine the space coordinates of the first sample points in the camera coordinate system according to pixel coordinates of the first sample points in the depth map; and calculate the space heights of the first sample points according to the space coordinates of the first sample points and the gravity acceleration information.

In an optional implementation, the second determining module 550 is specifically configured to: select a second preset number of groups of sample points from the second sample points, where the number of each group of sample points is at least three; for each group of sample points, determine a ground equation of the group of sample points, and calculate a distance from each of the second sample points to a ground corresponding to the ground equation, and collect statistics on the number of points, the distance from which to the ground is less than a fourth threshold; and determine a ground equation corresponding to a maximum number as the optimal ground equation.

For the implementation process of functions and effects of the units in the foregoing apparatus, refer to the implementation process of corresponding steps in the foregoing method for details. Details are not described herein again.

Because an apparatus embodiment basically corresponds to a method embodiment, reference needs to be made only to some descriptions in the method embodiment for relevancy. The apparatus embodiments described above are merely illustrative, and the units described as separate parts may or may not be physically separate, and the parts displayed as units may or may not be physical units, may be located at one position, or may be distributed on a plurality of network units. Some or all of the modules may be selected according to actual needs to achieve the objective of the solutions of this application. A person of ordinary skill in the art may understand and implement the solutions without creative efforts.

The foregoing descriptions are merely preferred embodiments of this application, and are not intended to limit this application. Any modification, equivalent replacement, improvement and the like made within the spirit and principle of this application should fall within the protection scope of this application.

What is claimed is:

1. A depth-map-based ground detection method, the method comprising:
   obtaining a current depth map and gravity acceleration information from a collection device;
   screening first sample points according to depth values of points in the depth map;
   determining space coordinates of the first sample points, and determining space heights of the first sample points according to the space coordinates and the gravity acceleration information;
   continuing to screen second sample points in the first sample points according to the space heights;
   determining an optimal ground equation according to space coordinates of the second sample points; and
   determining a ground point in the depth map by using the optimal ground equation.

2. The method according to claim 1, wherein the screening first sample points according to depth values of points in the depth map comprises:
   establishing a grid in the depth map by using a preset step, to obtain grid points, wherein the grid is formed by horizontal grid lines and vertical grid lines, and an intersection point of the horizontal grid line and the vertical grid line is a grid point;
   determining a grid point with a largest depth value in each horizontal grid line as a preliminary screening point;
   for each horizontal grid line, if a depth value of the preliminary screening point of the horizontal grid line exceeds a depth value of a preliminary screening point of a next horizontal grid line, determining the preliminary screening point of the horizontal grid line as a secondary screening point; and
   determining secondary screening points that are of consecutive adjacent horizontal grid lines and that have a number greater than a first preset number as the first sample points, wherein the first sample points are possible ground points.

3. The method according to claim 2, wherein the continuing to screen second sample points in the first sample points according to the space heights comprises:
   determining a maximum value of the space heights of the first sample points;
   determining a difference between a space height of each of the first sample points and the maximum value;
   determining a point, the difference between whose space height and the maximum value is less than a first threshold as a first candidate point, and determining the number of the first candidate points;
   if the number exceeds a second threshold, determining the first candidate points as the second sample points; or
   if the number does not exceed the second threshold, determining an average value of the space heights of the first sample points, determining a difference between the space height of each of the first sample points and the average value, and returning to execute the process of determining a point, the difference between whose space height and the maximum value is less than a first threshold as a first candidate point.

4. The method according to claim 3, wherein before the determining an optimal ground equation according to space coordinates of the second sample points, the method further comprises:
   when the number of the first candidate points exceeds the second threshold, determining the to-be-expanded number of each horizontal grid line according to the number of the first candidate points;
   for each horizontal grid line on which each second sample point is located, determining a grid point, a difference between whose space height and a space height of the second sample point is less than a third threshold in the horizontal grid line as a second candidate point, and supplementing the second candidate point to the second sample points, until the number of the second candidate points reaches the to-be-expanded number.

5. The method according to claim 1, wherein the determining space coordinates of the first sample points, and determining space heights of the first sample points according to the space coordinates and the gravity acceleration information comprises:

establishing an image pixel coordinate system in the depth map, and establishing a camera coordinate system of the collection device, wherein in the image pixel coordinate system, an upper left vertex of the depth map is a coordinate origin, a horizontal direction is a u-axis, a vertical direction is a v-axis, and in the camera coordinate system, an optical center O of a depth camera is a coordinate origin, an optical axis of the depth camera is a ZC-axis, an XC-axis and a YC-axis of the camera coordinate system are respectively parallel to the u-axis and the v-axis, and a plane formed by the XC-axis and the YC-axis is a plane of the depth camera;

determining the space coordinates of the first sample points in the camera coordinate system according to pixel coordinates of the first sample points in the depth map; and calculating the space heights of the first sample points according to the space coordinates of the first sample points and the gravity acceleration information.

6. The method according to claim 1, wherein the determining an optimal ground equation according to space coordinates of the second sample points comprises:

selecting a second preset number of groups of sample points from the second sample points, wherein the number of each group of sample points is at least three;

for each group of sample points, determining a ground equation of the group of sample points, and calculating a distance from each of the second sample points to a ground corresponding to the ground equation, and collecting statistics on the number of points, the distance from which to the ground is less than a fourth threshold; and determining a ground equation corresponding to a maximum number as the optimal ground equation.

7. A depth-map-based ground detection apparatus, the apparatus comprising:

a processor, configured to:
obtain a current depth map and gravity acceleration information from a collection device;
screen first sample points according to depth values of points in the depth map;
determine space coordinates of the first sample points, and determine space heights of the first sample points according to the space coordinates and the gravity acceleration information;
continue to screen second sample points in the first sample points according to the space heights;
determine an optimal ground equation according to space coordinates of the second sample points; and
determine a ground point in the depth map by using the optimal ground equation.

8. The apparatus according to claim 7, wherein the processor is further configured to: establish a grid in the depth map by using a preset step, to obtain grid points, wherein the grid is formed by horizontal grid lines and vertical grid lines, and an intersection point of the horizontal grid line and the vertical grid line is a grid point; determine a grid point with a largest depth value in each horizontal grid line as a preliminary screening point; for each horizontal grid line, if a depth value of the preliminary screening point of the horizontal grid line exceeds a depth value of a preliminary screening point of a next horizontal grid line, determine the preliminary screening point of the horizontal grid line as a secondary screening point; and determine secondary screening points that are of consecutive adjacent horizontal grid lines and that have a number greater than a first preset number as the first sample points, wherein the first sample points are possible ground points.

9. The apparatus according to claim 8, wherein the processor is further configured to: determine a maximum value of the space heights of the first sample points; determine a difference between a space height of each of the first sample points and the maximum value; determine a point, the difference between whose space height and the maximum value is less than a first threshold as a first candidate point, and determine the number of the first candidate points; if the number exceeds a second threshold, determine the first candidate points as the second sample points; or if the number does not exceed the second threshold, determine an average value of the space heights of the first sample points, determine a difference between the space height of each of the first sample points and the average value, and return to execute the process of determining a point, the difference between whose space height and the maximum value is less than a first threshold as a first candidate point.

10. The apparatus according to claim 9, the processor is further configured to:

before the processor determines the optimal ground equation according to the space coordinates of the second sample points, when the number of the first candidate points exceeds the second threshold, determine the to-be-expanded number of each horizontal grid line according to the number of the first candidate points; for each horizontal grid line on which each second sample point is located, determine a grid point, a difference between whose space height and a space height of the second sample point is less than a third threshold in the horizontal grid line as a second candidate point, and supplement the second candidate point to the second sample points, until the number of the second candidate points reaches the to-be-expanded number.

11. The apparatus according to claim 7, wherein the processor is specifically configured to: establish an image pixel coordinate system in the depth map, and establish a camera coordinate system of the collection device, wherein in the image pixel coordinate system, an upper left vertex of the depth map is a coordinate origin, a horizontal direction is a u-axis, a vertical direction is a v-axis, and in the camera coordinate system, an optical center O of a depth camera is a coordinate origin, an optical axis of the depth camera is a ZC-axis, an XC-axis and a YC-axis of the camera coordinate system are respectively parallel to the u-axis and the v-axis, and a plane formed by the XC-axis and the YC-axis is a plane of the depth camera; determine the space coordinates of the first sample points in the camera coordinate system according to pixel coordinates of the first sample points in the depth map; and calculate the space heights of the first sample points according to the space coordinates of the first sample points and the gravity acceleration information.

12. The apparatus according to claim 7, wherein the processor is further configured to: select a second preset number of groups of sample points from the second sample points, wherein the number of each group of sample points is at least three; for each group of sample points, determine a ground equation of the group of sample points, and calculate a distance from each of the second sample points to a ground corresponding to the ground equation, and collect statistics on the number of points, the distance from which to the ground is less than a fourth threshold; and determine a ground equation corresponding to a maximum number as the optimal ground equation.

\* \* \* \* \*